US00RE36435E

United States Patent [19]

Grenier et al.

[11] E Patent Number: Re. 36,435

[45] Reissued Date of Patent: Dec. 14, 1999

[54] VAPORIZATION-CONDENSATION APPARATUS FOR AIR DISTILLATION DOUBLE COLUMN, AND AIR DISTILLATION EQUIPMENT INCLUDING SUCH APPARATUS

[75] Inventors: Maurice Grenier, Paris; Pierre Petit, Chatenay Malabry, both of France

[73] Assignee: L'Air Liquide, Societe Anonyme Pour L'Etude et L'Exploitation Des procedes Georges Claude, Paris, France

[21] Appl. No.: 08/498,444

[22] Filed: Jul. 5, 1995

Related U.S. Patent Documents

Reissue of:

[64] Patent No.: 5,071,458
Issued: Dec. 10, 1991
Appl. No.: 07/558,091
Filed: Jul. 25, 1990

[30] Foreign Application Priority Data

Jul. 28, 1998 [FR] France ..... 89 10223

[51] Int. Cl.[6] ..... F25J 3/00

[52] U.S. Cl. ..... 62/643; 165/166; 202/153

[58] Field of Search ..... 62/643, 903; 165/166; 202/158

[56] References Cited

U.S. PATENT DOCUMENTS

| | | |
|---|---|---|
| 4,017,284 | 4/1977 | Gifford . |
| 4,579,566 | 4/1986 | Braugerolle . |
| 4,599,097 | 7/1986 | Petit et al. . |
| 4,606,745 | 8/1986 | Fujita . |

*Primary Examiner*—Ronald Capossela
*Attorney, Agent, or Firm*—Frommer Lawerence & Haug, LLP; William S. Frommer

[57] ABSTRACT

The air distillation double column (1,2) includes an apparatus for vaporizing oxygen and condensing nitrogen which comprises on one hand a running type main heat exchanger (7) which is partially immersed during stoppage of the equipment and on the other hand an auxiliary heat exchanger (20) which alone is responsible for liquid vaporization when the equipment is restarted.

9 Claims, 2 Drawing Sheets

VAPORIZATION-CONDENSATION APPARATUS FOR AIR DISTILLATION DOUBLE COLUMN, AND AIR DISTILLATION EQUIPMENT INCLUDING SUCH APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to vaporizers-condensers of air distillation equipments. It first concerns an apparatus for vaporizing oxygen and condensing nitrogen for an air distillation double column of the type comprising at least a main heat exchanger disposed in the vat portion of the low pressure column, this exchanger being of the running type and including oxygen ducts, means for causing oxygen in excess to run in these ducts, means for withdrawing total vaporized oxygen and excess liquid [nitrogen] *oxygen* through the lower ends of these same ducts nitrogen ducts in indirect heat exchange relationship with the oxygen ducts, means for feeding nitrogen gas originating from the mean pressure column to the nitrogen ducts, and means for returning condensed nitrogen to the mean pressure column.

2. Description of Prior Art

In the equipments for the distillation of air of the double column type, the liquid oxygen which is found in the vat portion of the low pressure column is vaporized by heat exchange with nitrogen gas taken in the head portion of the mean pressure column. For a given operating pressure of the low pressure column, the temperature difference between oxygen and nitrogen which is made necessary by the structure of the heat exchanger affects the operating pressure of the mean pressure column. It is therefore desirable that this temperature difference be as low as possible, in order to minimize the expenses associated with the compression of the air to be treated which is injected in the mean pressure column.

The vaporizers-condensers of the running type are very advantageous because of their excellent heat exchange performances, and can be reliably and economically produced as a result of the technology described in EP-A-130 122 in the name of the Applicant.

However, the following problem occurs.

During a stoppage of the equipment for the distillation of air as a result of an incident (temporary cut of electricity, machine break, etc. . . ) or a programmed stoppage, the liquids accumulated on the plates of the upper column (low pressure column) and [eventually] *possibly* in the argon mixture column which is associated with the double column, and even the liquids accumulated on the plates of the lower column (mean pressure column), if no step is taken with respect to the operation of the valve for the upward movement of enriched liquid, will be poured in the vat of the low pressure column, precisely where the vaporizer-condenser is mounted.

With units in which high purities and high yields of extraction are required, there is a large number of plates and the "working charge" of liquid thus abruptly poured in the vat of the low pressure column in the case of a stoppage, will represent a height of many meters. When the exchanger is mounted in the vat of the low pressure column and when the exit of oxygen, in the form of gas as well as liquid can only take place at the base of the exchanger, the latter, then being at least partially immersed, is not capable of reprinting again when restarting the equipment.

The resumption of operation of the unit after a few moments, a few hours or even a few days of stoppage therefore requires a previous flushing of the liquid still present in the vat, while this liquid is welcome since it enables to instantaneously recharge the plates of the various columns of which it constitutes the "working charge".

To reprime the vaporizer-condenser without flushing the liquid which is accumulated in the vat, one would think either of mounting the exchanger at a sufficient height from the bottom of the vat of the column so that the liquid collected does not reach the lower part of this exchanger, or of mounting outside the column, or as an appendix or as a standing out of the column vat, an element capable of retention of this liquid. However, these solutions necessitate a large space which would not be in use in normal operation, and which would represent an excessive investment cost

SUMMARY OF INVENTION

It is an object of the invention to solve the problem of repriming the heat exchanger in a relatively economical manner.

For this purpose, it is an object of the present invention to provide a vaporizer-condenser of the above type, characterized in that the main heat exchanger is disposed so as to be at least partially immersed during a stoppage of the operation of the double column, and in that the apparatus comprises at least an auxiliary heat exchanger adapted to alone ensure the vaporization of liquid when the main exchanger is at least partially immersed.

According to a first embodiment, the auxiliary exchanger is an exchanger of the running type containing oxygen ducts, means for causing oxygen to run in excess in these ducts, nitrogen ducts in indirect heat exchange relationship with the oxygen ducts, means for feeding nitrogen gas originating from the mean pressure column, and means to return condensed nitrogen to the mean pressure column, the auxiliary exchanger being entirely located above the maximum level of the liquid in the vat of the low pressure column. Also, there are provided means enabling to upwardly move this liquid to the top of the oxygen ducts of the auxiliary exchanger as well as means to send liquid from the lower end of the auxiliary exchanger to the top of the oxygen ducts of the main exchanger.

According to a second embodiment, the auxiliary exchanger is an exchanger of the same type as the main exchanger and is mounted substantially at the same level as the latter in the vat of the low pressure column, the top of the oxygen ducts of the auxiliary exchanger being exclusively supplied through a duct enabling the upward movement of the liquid contained in this vat.

According to a third embodiment, the other heat exchanger is an exchanger of the bath type disposed below the main exchanger in the vat of the low pressure column.

It is also an object of the invention to provide a double column air distillation equipment, comprising a vaporization-condensation apparatus as defined above.

BRIEF DESCRIPTION OF DRAWINGS

Some exemplified embodiments will now be described with respect to the annexed drawings, in which.

DESCRIPTION OF PREFERRED EMBODIMENTS

Figure 1:
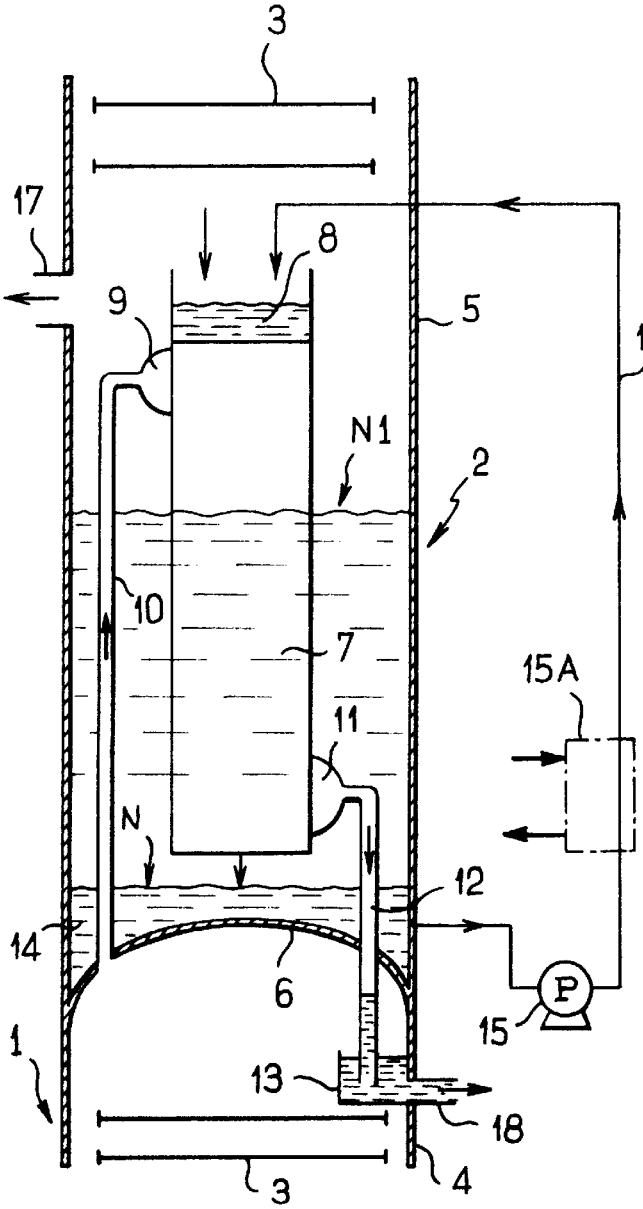
FIG. 1 is a schematic representation of the structure and the operation of a heat exchanger of the running type and with an oxygen exit exclusively through the bottom.

Each figure shows the top of the mean pressure column 1 and the vat of the low pressure column 2 of a double column air distillation equipment. It is seen that each column comprises distillation plates 3 or an equivalent structure for heat and material exchange. Column 1, which operates under about 6 bars absolute, is defined by a cylindrical member 4, and column 2, which operates slightly above atmospheric pressure is defined by cylindrical member 5. The two columns are separated by a bottom portion 6 which is upwardly bulging. Nitrogen is condensed at the head of column 1 by vaporizing liquid oxygen reaching the vat of column 2, by means of an indirect heat exchanger of the running type.

The exchanger 7 essentially comprises a parallelepipedic block of large dimensions, for example 1 to 1.5 square meter of horizontal cross-section and 3 to 6 meters high, formed by piling a large number of parallel vertical plates made of aluminum which define flat ducts between one another. Each of these ducts contain aluminum waves defining braces and wings and is bound by vertical or horizontal bars. A portion of these ducts, for example every second one, is an oxygen duct and the remaining ducts are nitrogen ducts. The oxygen ducts are supplied at the top with liquid oxygen by means of a liquid holder 8 formed above the exchanger, laterally closed and opened towards the bottom. The nitrogen ducts are closed on all sides and are laterally supplied with nitrogen gas in the vicinity of their upper ends, by means of a semi-cylindrical box 9 with horizontal axis, which communicates with the top of column 1 by means of a duct 10. The condensed nitrogen is laterally collected at the bottom of the same ducts by means of another semi-cylindrical box 11 with horizontal axis and, from there, is sent in column 1 through duct 12. The latter opens in a channel 13 which constitutes a holder for liquid nitrogen. The block for the exchanger 7 is assembled by oven braising.

In normal operation, a bath of liquid oxygen 14 is present in the vat of the column 2, and its level N is below the lower end of the exchanger 7, at a small distance from the latter. A pump 15 sends upwardly via a duct 16 a flow D of liquid oxygen in the holder 8, which also receives a flow D of liquid oxygen from the plates of column 2. A flow D of oxygen is vaporized in the exchanger 7, so that a flow D of liquid oxygen in excess falls into bath 14. In practice, the flows can vary slightly from value D.

Other details concerning the structure and the operation of such a running vaporizer-condenser are described in EP-A-130 122 mentioned above.

As a variant, pump 15 can be replaced by any other means of [upwardly] moving liquid *upwards*, for example by means of a thermosiphon or gas "extraction" comprising an indirect heat exchanger 15A heated with an appropriate fluid, which can be the "rich liquid" originating from the vat of column 1, as it is known in the art. On FIG. 1, this variant has been represented in broken line and a duct 17 for withdrawing oxygen gas from column 2 and a duct 18 for withdrawing liquid nitrogen from column 1 have also been illustrated.

To reduce [at a maximum] *as much as possible* the height of the lower pressure column, it is provided that the level N is at a small distance below the exchanger 7, as indicated above. If the equipment is stopped as explained above, the "working charge" of many plates is collected in the vat portion of column 2, and the liquid climbs up to a level N1 in which the exchanger 7 is partially immerse. In particular, there is a certain height of liquid in the lower portion of the oxygen ducts of this exchanger. When the equipment is stared again, a small quantity of oxygen is vaporized, but since the oxygen ducts are opened only towards the bottom, a state of equilibrium is rapidly achieved, and the exchanger cannot continue to operate. FIGS. 2–5, on which the ducts concerning nitrogen have been omitted for better illustration of the drawing, show how the equipment can be modified according to the invention to enable the repriming of the exchanger 7.

Figure 2:
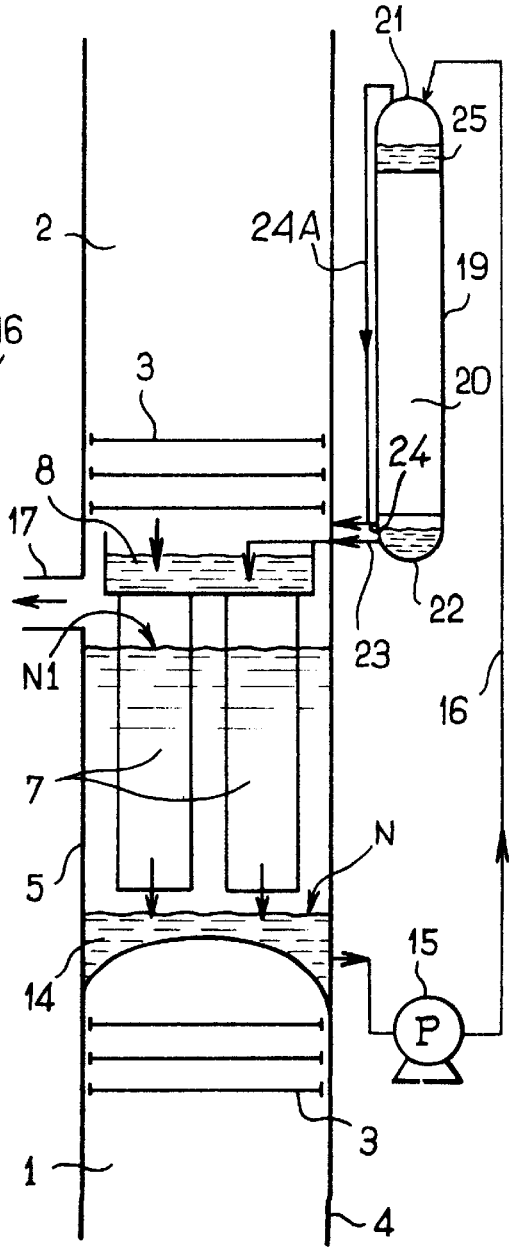
FIGS. 2–6 are schematic representations of a portion of an air distillation equipment according to the invention, according to many different embodiments of the vaporization-condensation apparatus.

In the solution of FIG. 2, the vat of column 2 contains two main heat exchangers 7 disposed in parallel at the same level as FIG. 1, i.e. with their lower ends very close to the bottom 6, just above level N of the bath of liquid oxygen. The holder 8 is common to both exchangers.

The equipment includes an auxiliary cylindrical member 19 containing an auxiliary heat exchanger 20. This exchanger is also of the running type and is similar to exchanger 7. Cylindrical member 19 is closed at the top by an upper partition 21 and at the bottom by a lower partition 22, the latter being above the lever of the holder 8 of exchangers 7. Duct 16 for the upward movement of liquid opens at the top of cylindrical member 19; a duct 23 connects the bottom 22 to holder 8, and ducts 24 and 24A, respectively connect the space located immediately below exchanger 20 and the space located above partition 21 to the region of the cylindrical member 5 located immediately above holder 8.

In normal operation, pump, 15 moves liquid oxygen upwardly bath 14 above cylindrical member 19 to maintain an auxiliary liquid holder 25 above the exchanger 20. About half of this flow of liquid is vaporized in the exchanger, and the excess of liquid oxygen as well as vaporized oxygen pass through cylindrical member 5 via ducts 23 and 24. The excess liquid oxygen is added to the liquid oxygen falling from the plates of column 2 in the holder 8, and about half of the total flow of liquid oxygen feeding the latter is vaporized in the exchangers 7, the excess liquid being taken over by the pump 15.

During a stoppage of the equipment, the vat liquid of column 2 moves upwardly to level N1 as in FIG. 1. To reprime the equipment, pump 15 pushes some liquid up to the top of the auxiliary exchanger 20, which through its position, remains operational. A portion of the flow of liquid is therefore vaporized through the sole action of the exchanger 20, and the excess liquid as well as the vaporized liquid is sent, as previously, into cylindrical member 5, via ducts 23 and 24. Then, the liquid level progressively decrease in column 2, and when the level N returns about to normal, the exchangers 7 can resume their operation. The dimensions of exchanger 20 are such as to permit the equipment to treat a flow of air which is required for priming the plates in order that their "working charge" be reconstituted, this flow of air being lower than the flow corresponding to the normal operation of the equipment.

Thus, the additional cylindrical member 19 and the auxiliary exchanger 20 are constantly used as additional heat exchange surface which improves the thermic performance of the equipment.

As a variant, the exchanger 20 may be disposed at a level which is lower than the holder 8 or even lower than level N1 with an additional pump provided on the duct 23. On the other hand, cylindrical member 19 can be made of the exchanger block per se in its running portion.

Figure 3:
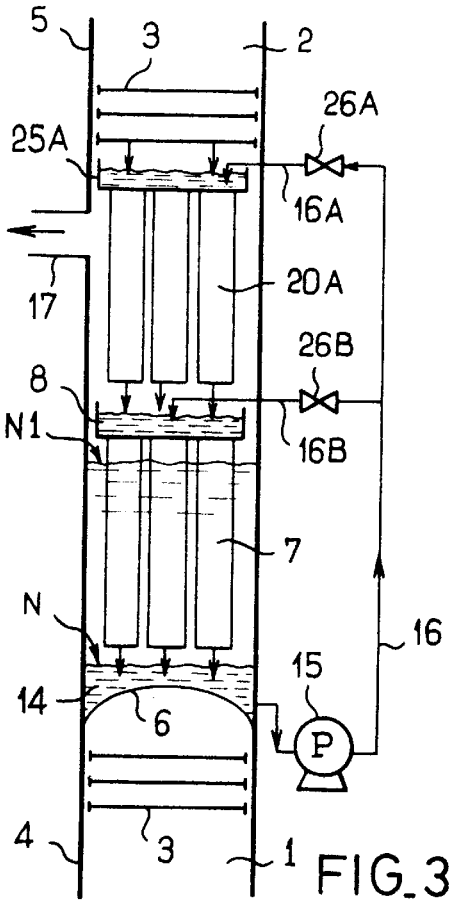

In the equipment of FIG. 3, there are three exchangers 7 and they are disposed Sin FIG. 2, side by side and immediately above bath 14, with a common holder 8. The auxiliary exchanger is made of three exchangers 20A which are identical to exchanger 7 and are disposed in column 2 immediately above the latter. Duct 16 comprises a branch 16A opening in the holder 25A of exchangers 20A, and a branch 16B opening in the holder 8 of exchangers 7. These ducts are provided with respective stop valves 26A and 26B.

In normal operation; the bath 14 of liquid oxygen is at level N. Valve 26A is closed and valve 26B is opened. The auxiliary exchangers 20A are supplied with liquid oxygen exclusively by means of the plates of column 2, they vaporize just about half this flow and send the remainder to holder 8. A flow of the same order is moved upwardly to holder 8 by means of pump 15, half of the total flow is vaporized in the exchangers 7 and the remaining portion falls into bath 14.

During a stoppage of the equipment, the upward movement of the liquid to level N1 causes the exchangers 7 to be partially immersed. When the equipment is again started, valve 26B is closed, valve 26A is opened, and pump 15 moves liquid upwardly to upper holder 25A. A portion of this flow is vaporized, the liquid progressively lowers in the vat of the column, and when the liquid returns to approximately the level N, the exchangers 7 resume their operation. The advantage of this solution resides in the fact that it is possible to dispose auxiliary exchangers having a much higher heat surface than the cylindrical member of the column per se, which enables further improvement in the heat exchange performance in normal operation, for example to reach a temperature difference on the order of 0.5° C. between mean pressure nitrogen and liquid oxygen. It will be noted, moreover, that duct 17 for withdrawing oxygen gas can be disposed anywhere between the top of exchangers 7 and the plates of column 2 without running the risk of removing some liquid.

It should be noted that the exchangers 20 of FIG. 2 and 20A of FIG. 3 could be designed so as to permit the withdrawal of the vaporized liquid from the top as described in the European Patent Application mentioned above.

Figure 4:
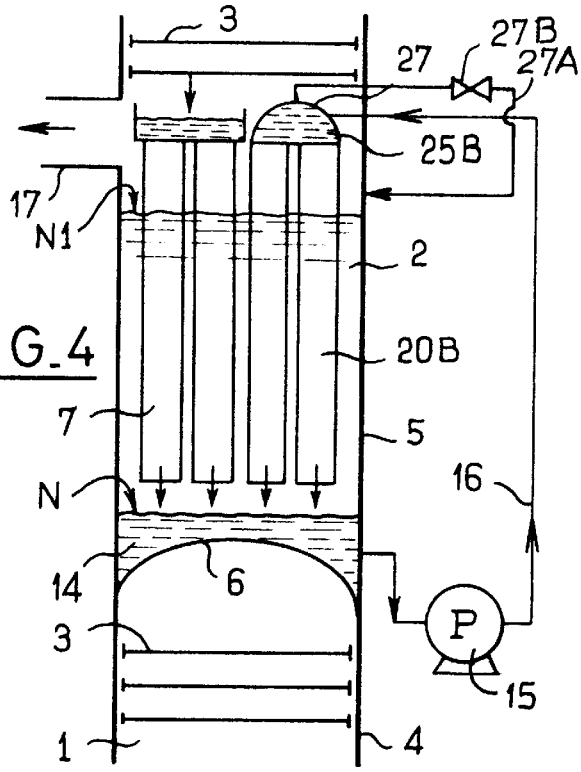

In the embodiment of FIG. 4, there are provided, side by side in cylindrical member 5, two main exchangers 7 and two auxiliary exchangers 20B. The four exchangers have their lower end located at a short distance above level N; they are all identical, with the exception that the two exchangers 7 have a common holder 8 which is opened at the top as in the previous examples while the two exchangers 20AB have a common holder 25B which is sealingly covered with a semi-cylindrical horizontal feeding box 27 to which duct 16 opens. A duct 27A starts from the top of the box 27, exits from cylindrical member 5, is provided outside the latter with a valve 27B and opens in cylindrical member 5, above level N.

In normal operation of the equipment, valve 27B is opened. The same flow reaches holder 8 as originating from the plates and the holder 25B via duct 16. Each exchanger vaporizes about a quarter of this flow, and the excess liquid falls in bath 14 to be sent upwardly via pump 15.

During a stoppage of the equipment, the liquid moves upwardly to the level N1 and partially immerses the four exchanges. To restart the installation, valve 27B is closed; the pump pushes some liquid upward in box 27 and introduces into the latter an overpressure which enables vaporized oxygen in the exchangers 20B to act against the thrust of the liquid bath in lower portion. The liquid progressively lowers in the vat of the column, the pressure in box 27 also decrease gradually and when the level N returns about to normal, the exchangers 7 start again to operate and valve 27B is opened.

The advantage of this solution is that no additional height of the cylindrical member 5 nor any auxiliary space outside the column are required.

Figure 5:
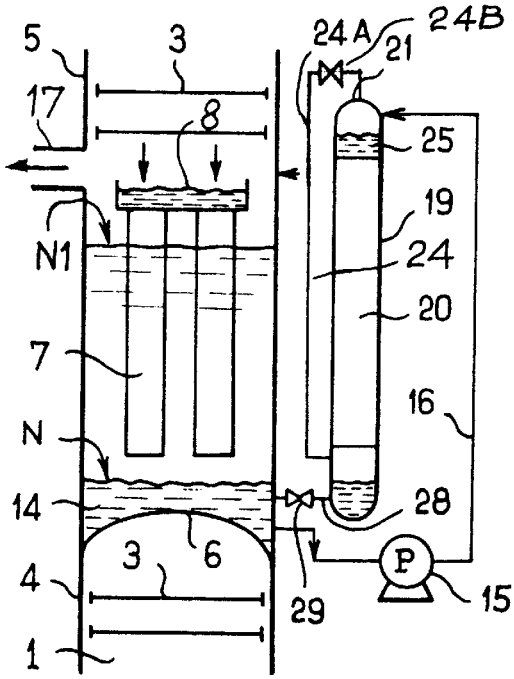

FIG. 5 represents a solution which may be considered as a variant of FIG. 2: the cylindrical member 19 is at a lower level than FIG. 2, the bottom 22 is substantially at the level of bottom 6 of the double column. A duct 28 provided with a valve 29, replacing the duct 23, connects the vats of the cylindrical members 8 and 19. As in FIG. 2 duct 24 connects the space located immediately below exchanger 20 to the region of cylindrical member 5 located above holder 8. Duct 24A is provided with a valve 24B.

In normal operation, the valves 29 and 24B are opened and level N is established in the two cylindrical members 5 and 19. Exchanger 20 constitutes an additional vaporizer-condenser which is supplied with liquid oxygen through the duct 16 while the exchanger 7 is supplied with liquid oxygen exclusively by means of the plates 3.

As soon as the equipment stops valve 29 is closed at the same time as the pump stops, which prevents the immersion of the exchanger 20. When restarting, liquid is vaporized through the sole action of the exchanger 20, and it will be relised it is a diphasic fluid which returns to column 2 via duct 24.

Another possibility is that valve 29 remains opened. The exchanger 20 is then partially immersed as is the case with the exchanger 7 during stoppages of the equipment, and restarting is carried out by closing valve 24B and by providing an overpressure at the upper end of the cylindrical member 19 by means of pump 15, in a similar manner as that which has been described with respect to FIG. 4. This way of restarting with the immersed exchanger 20 can, on the other hand still be carried out with valve 29 closed.

Figure 6:
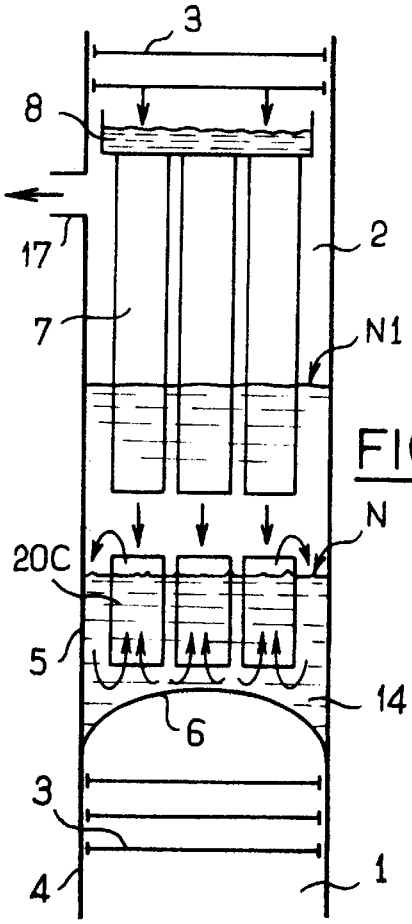

In the embodiment of FIG. 6, there are provided three exchangers 7 and, immediately below these exchangers and immediately above bottom 6, there are a plurality of, for example three auxiliary exchangers 20C of the bath or thermosiphon type. These exchangers differ from exchangers 7 in that there is no upper holder 8, the oxygen ducts being upwardly freely opened. Such exchangers, which are well known in the art of air distillation, may operate by being completely immersed. On the other hand, there is no duct 16.

In normal operation of the equipment, level N is such that the exchangers 20C are nearly entirely immersed. The holder 8 of the exchangers 7 is supplied with liquid oxygen originating solely from the plates. About half the flow is vaporized in these exchangers and the remaining portion falls into bath 14. Since the exchangers 20C vaporize this excess flow, it is therefore not necessary in principle to send some liquid towards holder 8. However as a variant, since the bath type vaporizers have a lower yield than the running type vaporizers, it may be preferable to adjust the size of the exchangers 20C so that they vaporize only a small fraction of the flow of liquid oxygen, the excess flow then being sent into holder 8 as previously mentioned.

During a stoppage of the equipment, the liquid climbs to level N1, so that the exchangers 20C are totally immersed and the exchangers 7 are partially immersed Restarting is carried out without difficulty, first exclusively through the vaporization provided by the exchangers 20C, then when the level N is substantially reestablished also by means of exchangers 7.

Due to the presence of bath type exchangers, the solution of FIG. 6 is more particularly suitable to those cases where relatively moderate heat exchange performance is acceptable, for example, a difference of temperature of the order of 1° C. between mean pressure nitrogen and liquid oxygen.

We claim:

1. Apparatus for vaporizing oxygen and condensing nitrogen for air distillation equipment of the double column type having a low pressure column containing a vat and a mean pressure column and comprising at least a main heat exchanger disposed in the vat of the low pressure column, said exchanger being of the running type and including oxygen ducts [and nitrogen ducts], means for causing oxygen to run in excess in said *oxygen* ducts, means for withdrawing total vaporized oxygen and excess liquid oxygen through a lower end of said *oxygen* ducts, *nitrogen ducts* in indirect heat exchange relationship with the oxygen ducts, means for feeding nitrogen gas originating from the mean pressure column to the nitrogen ducts and means for returning condensed nitrogen to the mean pressure column, wherein the main heat exchanger is mounted so as to be at least partially immersed during a stoppage in the operation of the air distillation equipment, the improvement comprising at least an auxiliary heat exchanger for ensuring, substantially by itself, liquid vaporization when the main exchanger is at least partially immersed.

2. The improvement according to claim 1, wherein the auxiliary exchanger is of the running type containing oxygen ducts and nitrogen ducts in indirect heat exchange relationship with the oxygen ducts, means for feeding the nitrogen ducts with nitrogen gas originating from the mean pressure column, means for supplying excess liquid oxygen from the auxiliary exchanger to the main heat exchanger, means to return condensed nitrogen in the mean pressure column, means for returning liquid oxygen contained in the vat of the low pressure column to the top of the oxygen ducts of the auxiliary exchanger and means for returning liquid oxygen from the lower end of the auxiliary exchanger to the top of the oxygen ducts of the main exchanger.

3. The improvement according to claim 2, wherein the auxiliary exchanger is entirely located above a maximum level of the liquid oxygen in the vat of the low pressure column.

4. The improvement according to claim 3, wherein the auxiliary exchanger is entirely mounted above the top of the main exchanger.

5. The improvement according to claim 4, wherein the auxiliary exchanger is mounted in the low pressure column above the main exchanger.

6. The improvement according to claim 2, wherein the auxiliary exchanger is mounted outside the low pressure column.

7. The improvement according to claim 1, wherein the auxiliary exchanger is an exchanger of the same type as the main exchanger and is mounted at substantially the same level as the main exchanger, the top of the oxygen ducts of the auxiliary exchanger being covered with a sealed feeding box supplied exclusively through a duct for moving liquid contained in said vat upwardly to said auxiliary exchanger.

8. The improvement according to claim 1, wherein the auxiliary heat exchanger is a bath type exchanger mounted below the maim exchanger in the vat of the low pressure column.

9. Equipment for air distillation of the double column type having a low pressure column and a mean pressure column and comprising at least a main heat exchanger disposed in the low pressure column, said exchanger being of the running type and including oxygen ducts for causing oxygen to run in excess in said ducts, means for withdrawing total vaporized oxygen and excess liquid oxygen through an end of said ducts, *nitrogen ducts* in indirect heat exchange relationship with the oxygen ducts, means for feeding nitrogen gas from the mean pressure column to *said* nitrogen ducts, and means for returning condensed nitrogen to said mean pressure column, wherein said main heat exchanger is mounted so as to be at least partially immersed during a stoppage in the operation of the double column, the improvement comprising at least an auxiliary heat exchanger for providing, by itself, liquid vaporization when said main exchanger is at least partially immersed in said liquid oxygen.

* * * * *